INVENTOR.
ROBERT TOUVAY

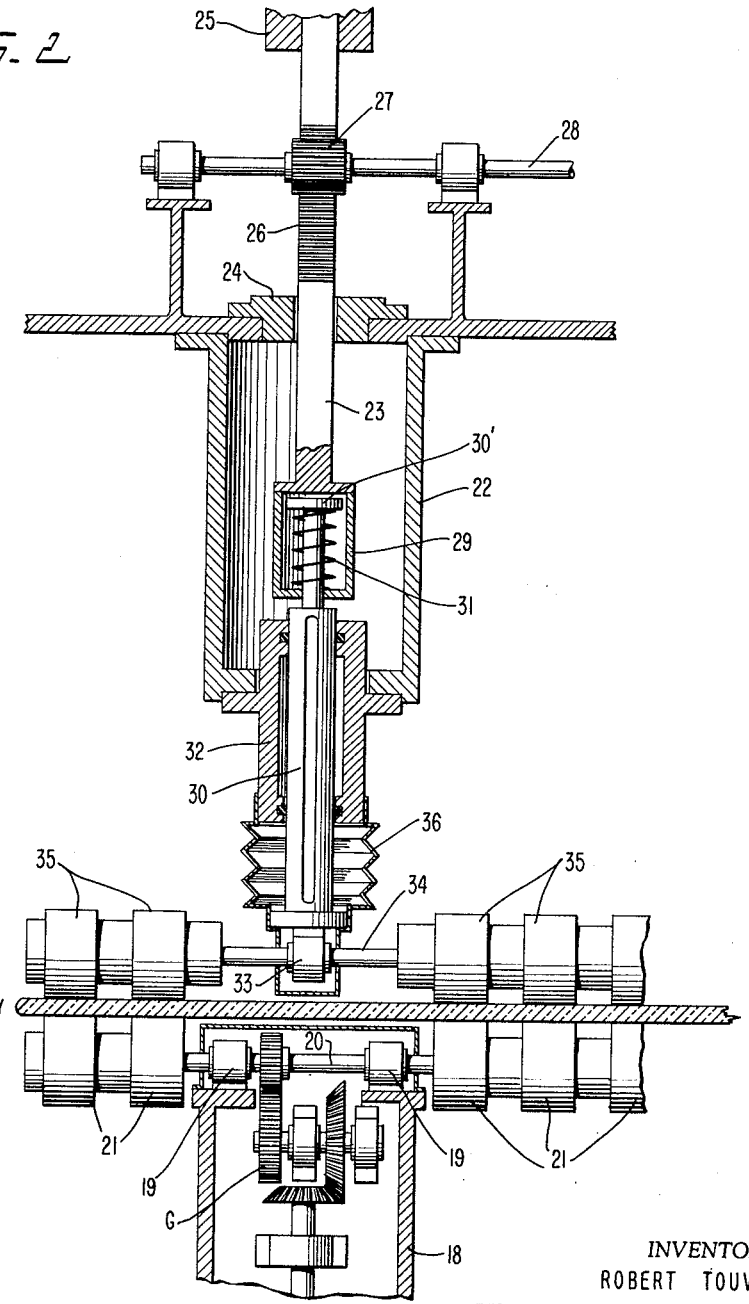

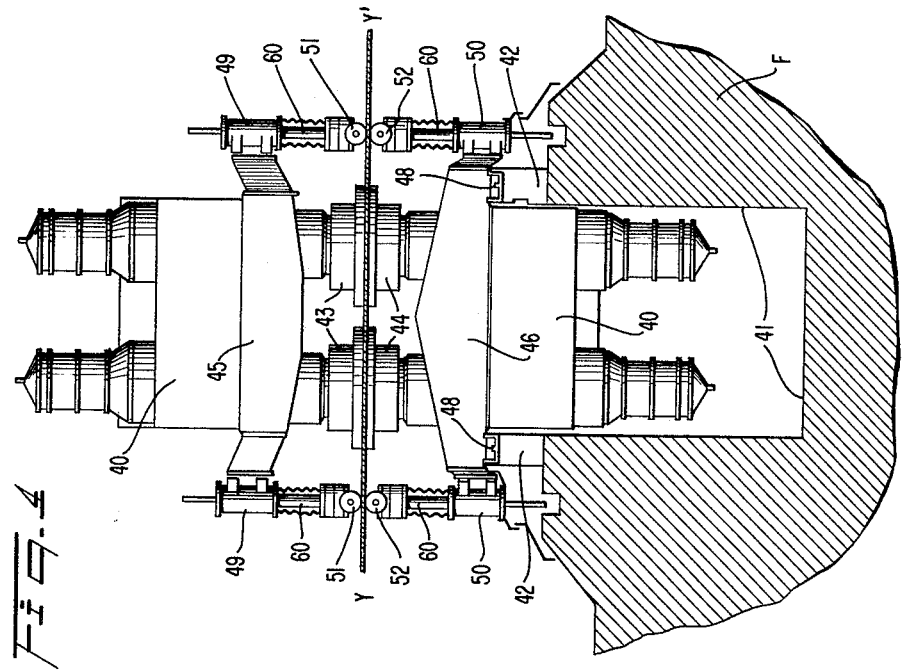
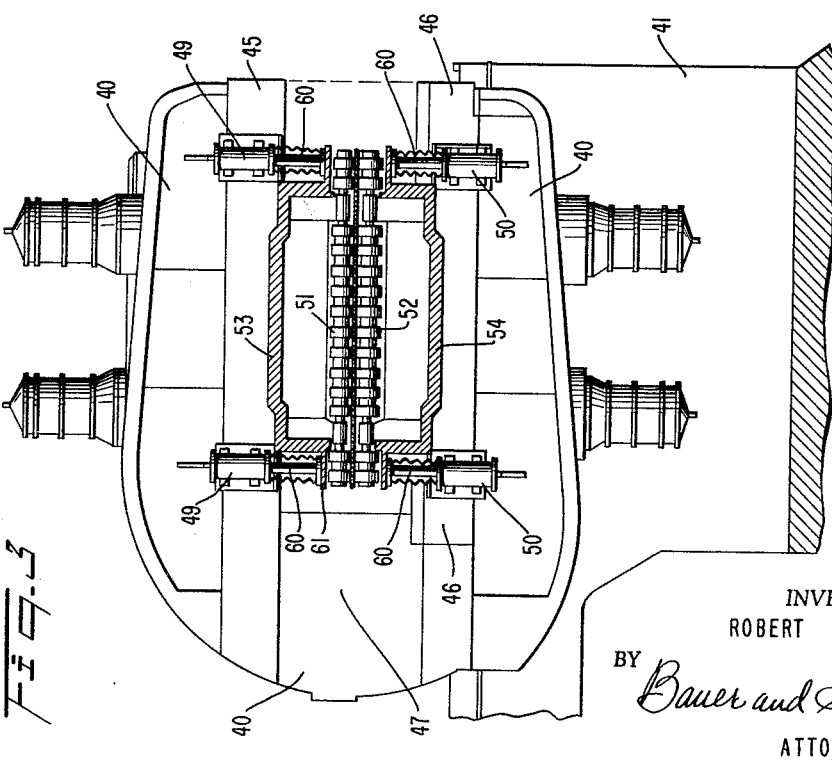

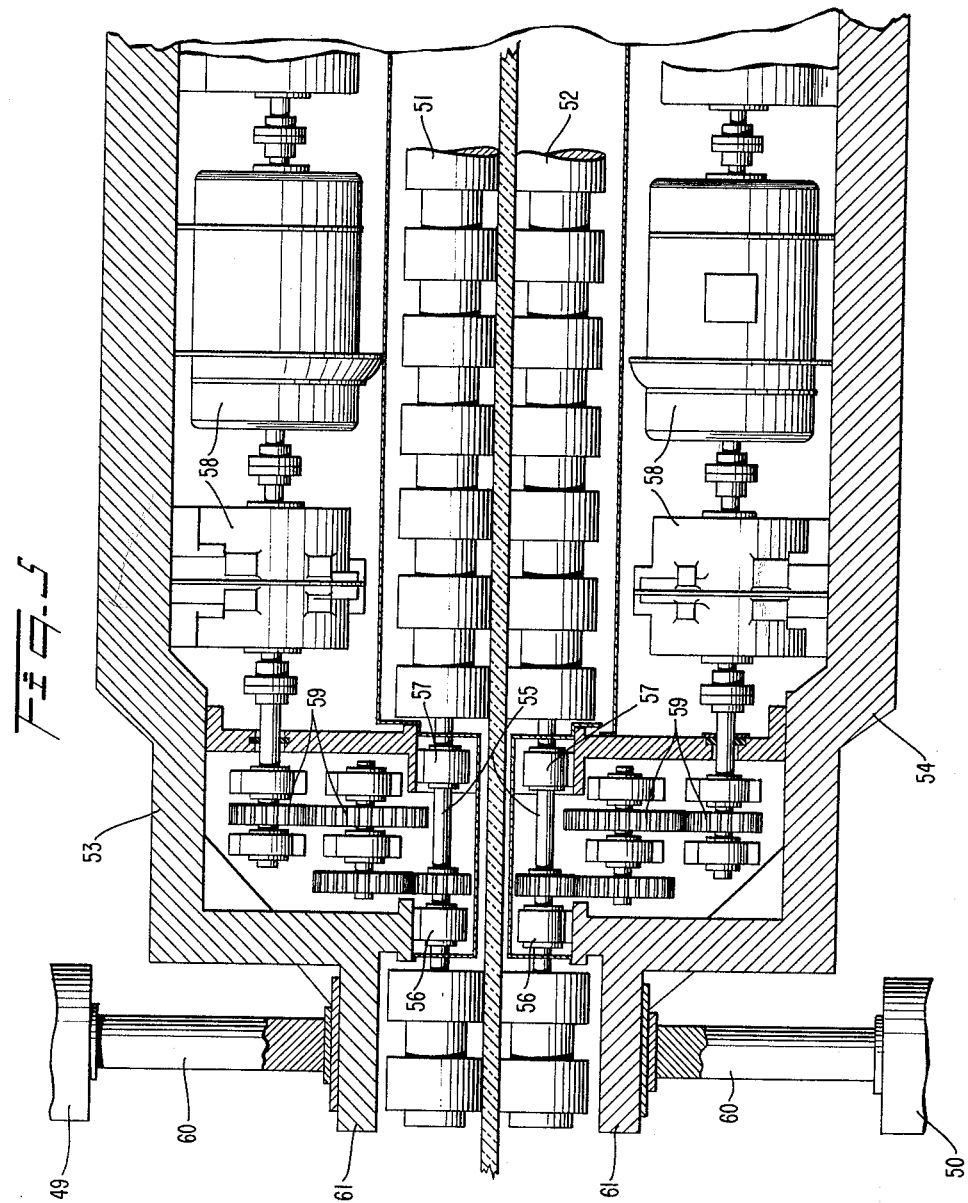

United States Patent Office 3,177,625
Patented Apr. 13, 1965

3,177,625
APPARATUS FOR SIMULTANEOUSLY WORKING THE SURFACES OF A MOVING SHEET OF GLASS
Robert Touvay, Paris, France, assignor to Compagnie de Saint-Gobain, Neuilly-sur-Seine, France
Filed Mar. 14, 1962, Ser. No. 179,623
Claims priority, application France, Mar. 21, 1961, 856,318
16 Claims. (Cl. 51—112)

This invention relates to apparatus for working the surfaces of a moving sheet simultaneously and as the invention is particularly applicable to the grinding and polishing of glass as it issues as a continuous sheet from a forming machine the invention will be described in that connection.

Apparatus for simultaneously working the opposite faces of a moving sheet of glass is already known and is classified in two general types of which the first involves rotating discs which are applied to the opposite faces of the glass, and of which the second relates to use of elongated runners operating in translatory motion against the opposite faces of the glass. This invention is applicable to these and to all other types of surface working implements. There have already been described in French Patents Nos. 982,542, 1,021,821 and 1,095,528 tools which are attached to supports which can be moved with respect to the base of the apparatus so that it is possible to put these tools into contact with the upper or lower face of the moving sheet of glass or to withdraw them by a movement parallel or approximately parallel to the surfaces of the glass without interrupting the uniform progress of the sheet. According to those patents the upper and lower supports of a single pair of tools may be displaced together or separately. In both cases, the supports and tools supported, having been displaced laterally it is possible to proceed to the cleaning and repairing of the tools or to replace parts without stopping the progress of the glass sheet.

In such mechanisms the glass must be supported and moved by other means and these involve a series of rollers which support the glass and grip it and, some of them being driven move it to and away from the tools. It is unfortunately the case that, when the moving and transporting system requires repair the machine must be stopped. This is excessively costly in time, labor, and production.

It is a major object of this invention to maintain the working of the sheet while the transporting and driving mechanism is being repaired. Another object is to reconstitute the apparatus employed in perfecting glass sheet by the continuous process so that the surface working, the transporting, and the driving mechanism is assembled in convenient units each of which can be removed without interrupting the process or impairing the result.

The objects of the invention are accomplished, generally speaking, by apparatus for perfecting the faces of a moving glass sheet comprising tracks extending across the sheet above and below it, a frame movably supported on the upper tracks, a frame movably supported on the lower tracks, opposed surface working tools mounted on the upper and lower tracks for operation against the opposite faces of the sheet of glass, opposed sheet supporting and advancing means mounted on the frames including opposed rollers, and means to retract the tools and the rollers from contact with the sheet. According to this invention the surface working tools and the supporting and glass moving means are assembled in convenient units, all sheet contacting portions of which are retractable and each of which can be removed for replacement or repair without interrupting the operation of the other similar units.

In carrying out the invention the upper and lower supporting and driving rollers which control the glass, their motors and power transmitting means are mounted in units which may be moved laterally, individually or together, until they are clear of the glass sheet and in a position to be readily worked on. In order to accomplish this tracks extend across the glass sheet above and below it, frames are slidably mounted on the tracks and the working tools and the supporting and advancing means including the rollers are mounted on the frames. Thus, the upper unit may be composed of one or more surface working elements supported on the frame together with one or more rollers for supporting and advancing the sheet. Similarly the lower unit may be composed of the opposing surface working elements and sheet supporting and advancing means mounted on the lower, transversely movable frame.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical elevational view partly in section of an operational unit constructed according to the principles of the invention;

FIG. 2 is a view in section on an enlarged scale of novel mounted and driving means for the rollers of the unit;

FIGS. 1 and 2 show the application of the invention to the grinding of the moving sheet of glass, FIGS. 3, 4 and 5 show the application of the invention to the polishing stage.

FIG. 3 is a transverse vertical section through the roller mounting mechanism of a polishing apparatus employing runners moving with translatory motion.

FIG. 4 is a vertical elevational view of the apparatus of FIG. 3;

FIG. 5 is an enlarged detail of the driving and controlling means of the unit.

Figure 1:
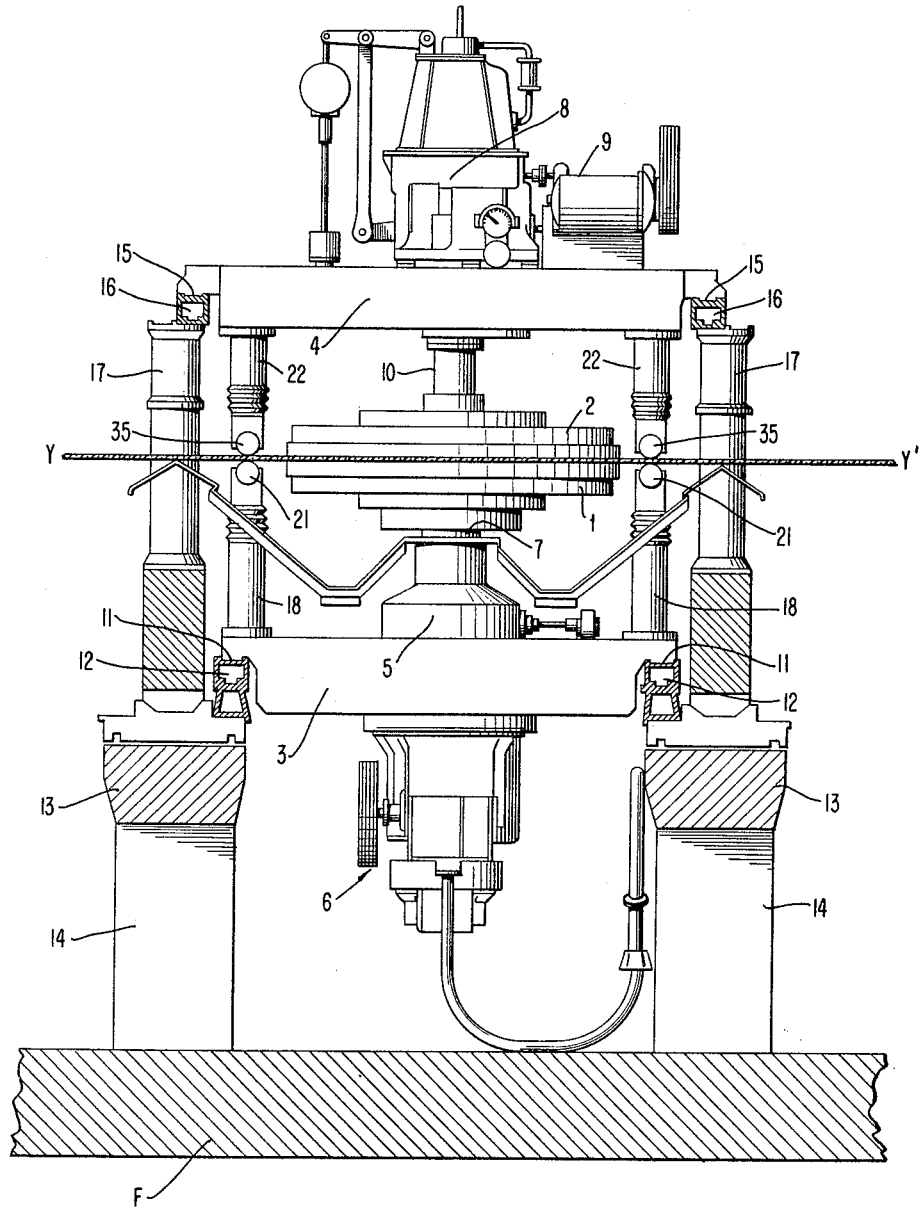

In a first embodiment of the invention, represented in FIGS. 1 and 2, as used for the grinding of glass, the supports of the tools are mounted independently in the frame so that it is possible to displace said supports independently. If, for example, the upper support is alone displaced it is easy to replace either the upper or the lower tools.

Referring now to the numerals of the drawing and to FIGS. 1 and 2 which deal with the novel unit as applied to the grinding of glass, F is the foundation on which the glass machine rests, 14, 13 are standards which support the unit, 12—12 are rails extending across the moving sheet and supported on standards 14—14. These rails may extend as far beyond the edge of the sheet as is necessary to give the repair crew freedom of access to all parts of the unit. 17—17 are standards which are supported upon standards 14—14 and which carry rails 16—16 which also extends laterally beyond the dimensions of the glass sheet and preferably in a direction opposite to that of rails 11—11 in order that the upper and lower units may be removed simultaneously to opposite sides of the sheet, if need be. A heavy frame 3 provided with runners 11 which fit the rail 12 and are slidable thereon carry a complete operational unit including the disc runner 1, its driving shaft and support 7, its driving mechanism 5, 6 and the lower supporting and driving rollers 21—21 which are supported at the upper ends of standards 18 which will be further described hereinafter. Standards 18 contain the roller driving mechanism and are mounted on the frame 3. This lower unit is removable laterally by retracting the disc runner 1 and the supporting rollers 21.

The upper frame 4 supports the upper disc runner 2, its supporting shaft 10, and its driving mechanism 8, 9 as well as the standards 22—22 which support the upper driving rollers 35—35. There may be as many of these units aligned longitudinally with the glass sheet as are necessary to perfect the grinding of its surface. Furthermore, a greater or lesser number of these units may be assembled for the carrying out of particular operations. Units not necessary for a particular operation can be retracted but left in position, if not needed.

In FIG. 2 is shown a preferred method of constructing the driving and gripping rollers during the grinding of the glass plate. The upper end of each standard 18 carries the gears generally indicated by G which drive the shaft 20, which is mounted at bearings 19—19 and support the rollers 21—21 which engage the lower faces of the glass sheet and fix its position during the working of its opposite faces. Once the process is underway the rollers 21—21 will generally be maintained in fixed position. The upper rollers 35—35 are mounted on a shaft 34 which is carried by a bearing 33 at the lower end of a rod 34 which is vertically movable in a standard 32, the upper end of which is provided with a head 30' which is received in a box 29 located on the lower end of a rod 23. A coil spring 31 extends between the bottom of the box and the head. The rod 23 is provided with a rack 26 which is engaged with a pinion 27 mounted on a shaft 28. By rotating the shaft the position of the rollers 35, and the amount of pressure put on them can be varied. The spring 31 provides a resilient connection useful in lifting the rollers from the surface of the glass and bellows 36 seals the apparatus against dust. The cylinder 32 gives rigid support to the column 30. In this form of the invention the upper roller is idle, not driven, while the lower roller is driven. The full driving effect necessary to the operation is secured by applying as much pressure to the rollers 35 as is necessary to provide firm driving contact with rollers 21. The position of the upper roller can be changed to accommodate different thicknesses of glass.

In a useful modification of the invention there may be only one pair of gripping and driving rollers to each unit, rather than the two which are shown in FIG. 1. In this case the upstream pair are preferred. The glass sheet Y—Y may be presumed to be moving from the left to the right as it is shown in FIG. 1. In FIG. 2 it may be presumed to be moving toward the observer.

Another form of the invention as applied to polishing is illustrated in FIGS. 3, 4, and 5. In FIG. 4 the glass Y—Y may be presumed to be moving from left to right and in FIGS. 3 and 5 to be moving towards the observer. A pit 41 is dug in the foundation F to receive the lower working elements, and supports 42 provided with tracks 48, extending laterally of the moving glass, receive frames 46 which have runners resting upon the tracks 48. A frame 40, C-shaped, rests on the rails 48. The upper polishing tools 43 and the lower polishing tools 44 are mounted on a support composed of two elements 45, 46 which are associated with an intermediate element 47. This unit may be displaced perpendicularly to the direction of advancement of the sheet Y—Y by moving it on the rails. The supports 49, 50 for the driving rollers 51, 52 are mounted on the frame elements 45, 46 so that these supports and the rollers attached to them are carried with the tools when they are moved transversely to the sheet of glass. The supports 49, 50 for the rollers are composed of cylinders attached to frame elements 45, 46. These cylinders contain screws which provide for the raising and lowering of the rollers 51, 52. The screws inside the cylinders 49, 50 are attached to rods 60 and these rods bear in turn upon small platforms 61 which are formed in the ends of frame members 53, 54. These frame members 53, 54 will be called sub-frames because they are movable independently of the main frame 40. The sub-frames 53, 54 support bearings 56, 57 in which are mounted shafts 55 which carry rollers 51, 52. The driving mechanism for the lower roller 52 is shown schematically mounted in the lower sub-frame 54 and the driving mechanism 58 for the upper roller 51 is shown schematically mounted in the upper sub-frame 53. The screws 49, 50 have a length sufficient to displace the rollers from the sheet of glass far enough to allow the removal of the entire operating unit by lifting the sub-frame 53 and lowering the sub-frame 54.

As the means of bringing the runners into contact with the surface of the glass does not differ from that which has heretofore been employed, it has not been shown.

In the operation of the device the rails are constructed in alignment with the course which is to be followed by the sheet of glass as it issues from the furnace and the forming machinery, an adequate number of grinding units is mounted on the rails and an adequate number of polishing units is mounted on the rails downstream the grinding unit. The lower driving rollers are then raised to exact supporting position to receive the advancing sheet of glass and the upper frames with their attendant rollers are then lowered to press upon the sheet and force it into driving contact with the lower rollers. The surfacing machinery is then advanced from below and above into contact with the moving sheet until all of the units that are necessary for the particular operation are engaged. For repairs of short duration a particular unit may be withdrawn from operation by retracting its rollers and surface working tools and sliding it sidewise to a position where it can be worked on, being returned to operating position as soon as repairs are made. If major reconstruction is involved the unit can be removed by a crane and replaced by another. In both cases interruption of the process is unnecessary. Spare grinding units not normally put into use can be mounted in position to take up the work of a unit which is withdrawn and the same may be done with the polishing units. In general, the concept of grinding and polishing machinery for the surface working of glass in a continuous process, in which the grinding and polishing apparatus is composed of individual units which can be removed, repaired and interchanged without interrupting the process is novel and wholly distinct from the known methods and apparatus in which the transporting mechanism constituted a single construction fixed to the foundation of the building.

As many apparently widely different embodiments of the present invention may be made without departing from the spirit and scope thereof, it is to be understood that the invention is not limited to the specific embodiments.

What is claimed is:

1. Apparatus for perfecting the faces of a moving glass sheet comprising tracks extending across the sheet above and below it, a frame movably supported on the upper tracks, a frame movably supported on the lower tracks, opposed surface working tools mounted on the upper and lower tracks for operation against the opposite faces of the sheet of glass, opposed sheet supporting and advancing means mounted on the frames including opposed rollers, and means to retract the tools and the rollers from contact with the sheet.

2. Apparatus according to claim 1 in which the supporting and advancing means includes an idle upper roller, a driven lower, supporting roller, and retractable, pressure means bearing on the upper roller.

3. Apparatus according to claim 2 in which the pressure means bearing on the upper roller is resilient.

4. Apparatus according to claim 2 in which the frames support a pair of opposed supporting and advancing rollers on opposite sides of the tools, each frame with its attachments being movable laterally on the tracks as a unit.

5. Apparatus according to claim 1 in which both upper and lower rollers are provided with driving means mounted on the frame.

6. Apparatus according to claim 5 in which the driving means for the upper roller is mounted on a subframe which is retractably mounted on the frame.

7. Apparatus according to claim 1 in which each frame supports a plurality of surface working tools between a plurality of supporting and driving rollers.

8. Apparatus for perfecting the faces of a moving glass sheet which includes surface working tools applicable to opposite faces of the sheet, a plurality of frame means supporting the opposed tools, sheet moving means supported by the frame means including at least a pair of gripping rollers, means to retract the tools and rollers from contact with the sheets, and means to move each frame means laterally.

9. Apparatus for perfecting the faces of a moving sheet which includes surface working tools applicable to opposite faces of the sheet, an independently movable frame means supporting each of the opposed tools, sheet moving means supported by and movable with each of the frame means comprising at least a pair of gripping rollers of which one is mounted on each said frame, means to retract the tools and rollers from contact with the sheets, and means to move each frame means away from the sheet.

10. Apparatus according to claim 9 in which a roller is supported by a shaft, the shaft is carried by a support, and the support is movably disposed in a hollow column, and the hollow column is attached to the said frame.

11. Apparatus according to claim 9 in which a roller is supported by a shaft, the shaft is supported by a subframe, a jack is operatively mounted on the said frame and bears on the subframe.

12. Apparatus according to claim 9 in which the rollers are mounted on shafts, driving means for a said shaft is mounted on a said frame, and includes reducing gears, and the reducing gears are drivably attached to the shaft.

13. Apparatus according to claim 9 in which the upper of two frames supports lifting means to which a said roller is operatively attached.

14. Apparatus according to claim 9 in which the upper frame supports a reciprocable, vertically aligned support, a shaft is mounted on the lower part of the support, a glass-contacting idler roller is mounted on the shaft, the lower frame carries a shaft, a glass-contacting roller, in position opposed to the upper roller, mounted on the shaft, and driving means for the roller operatively connected to the shaft.

15. Apparatus for improving the surface of a moving glass sheet as by grinding and polishing including a surface working tool and a glass-engageable roller mounted on an independently movable frame, said frame, tool, and roller constituting a unit separable from the apparatus as a whole, means on the frame to move the tool and roller to operating position in contact with the glass, and to retracted position out of contact therewith, and means to support the frame in working alignment with the glass sheet including means by which the frame can be moved out of working position and away from the course of the glass sheet.

16. Apparatus according to claim 15 including a plurality of retractable sheet engaging rollers mounted on the frame one of which is upstream and another of which is downstream of the said tool.

References Cited by the Examiner
UNITED STATES PATENTS

| | | | |
|---|---|---|---|
| 2,508,863 | 5/50 | Labby et al. | 51—112 |
| 2,709,875 | 6/55 | Touvay | 51—112 X |
| 2,833,090 | 5/58 | Touvay | 51—112 |

J. SPENCER OVERHOLSER, *Primary Examiner.*

JOHN C. CHRISTIE, *Examiner.*